UNITED STATES PATENT OFFICE.

THEOPHILUS MUNSON, OF NEAR HORINE STATION, MISSOURI.

PAINT.

SPECIFICATION forming part of Letters Patent No. 374,266, dated December 6, 1887.

Application filed February 10, 1887. Serial No. 227,165. (No specimens.)

*To all whom it may concern:*

Be it known that I, THEOPHILUS MUNSON, residing near Horine Station, in the county of Jefferson and State of Missouri, have invented a new and useful Composition of Matter to be Used for Paint, of which the following is a specification.

My composition consists of the following ingredients, combined in about the proportions stated, namely: Hydraulic cement, three parts, three pounds; clay, three parts, three pounds; milk, one gallon; and sugar or molasses, one pound. These ingredients are to be thoroughly mixed together and boiled about twenty minutes, and the compound is ready for use. A paint thus formed is water and fire proof and produces an excellent article, especially for outdoor use.

I am aware that paints have heretofore been made by a mixture of common lime, hydraulic lime, silicious matter, and milk. I am also aware that a paint has been made consisting of oxide of zinc, lime, rosin, milk, and linseed-oil; and I am also aware that a paint has been made consisting of lime, blood, clay, and glue; but none of these cover my compound.

I wish it understood that I do not confine myself to the exact proportions named. If preferred, one part each of glue and borax may be added to the compound to some advantage, though this is not necessary to form a good paint, and where the mixture is desired for staining purposes the addition of one part stale beer will be found advantageous.

What I claim as my invention, and desire to secure by Letters Patent of the United States, is—

A paint composed of a compound consisting of hydraulic cement, clay, milk, and molasses or sugar, mixed together in about the proportions named and boiled, substantially as set forth.

THEO. MUNSON.

In presence of—
  FRANK HAEFNER,
  BERNARD C. BUSTER.